United States Patent
Nyholm et al.

(10) Patent No.: US 10,620,172 B2
(45) Date of Patent: Apr. 14, 2020

(54) METHOD AND APPARATUS FOR PERFORMING LIQUID CHROMATOGRAPHY PURIFICATION

(71) Applicant: GE HEALTHCARE BIO-SCIENCES AB, Uppsala (SE)

(72) Inventors: Lena Nyholm, Uppsala (SE); Lotta Hedkvist, Uppsala (SE); Johan Arthursson, Uppsala (SE); Eva Cecilia Olsson, Uppsala (SE); Henrik Larsson, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 304 days.

(21) Appl. No.: 15/526,506

(22) PCT Filed: Nov. 16, 2015

(86) PCT No.: PCT/EP2015/076704
§ 371 (c)(1),
(2) Date: May 12, 2017

(87) PCT Pub. No.: WO2016/079061
PCT Pub. Date: May 26, 2016

(65) Prior Publication Data
US 2018/0120271 A1    May 3, 2018

(30) Foreign Application Priority Data
Nov. 17, 2014  (SE) .................................. 1451375

(51) Int. Cl.
*G01N 30/86* (2006.01)
*B01D 15/24* (2006.01)
(Continued)

(52) U.S. Cl.
CPC ....... *G01N 30/8631* (2013.01); *B01D 15/247* (2013.01); *G01N 30/82* (2013.01);
(Continued)

(58) Field of Classification Search
None
See application file for complete search history.

(56) References Cited

U.S. PATENT DOCUMENTS 5,350,520 A    9/1994  Kikumoto
6,652,746 B2 * 11/2003 Michel .................. G01N 30/82
                                                              210/143
(Continued)

FOREIGN PATENT DOCUMENTS

EP    0486030 A2    5/1992

OTHER PUBLICATIONS

PCT International Search Report and Written Opinion for PCT Application No. PCT/EP2015/076704 dated Feb. 5, 2016 (9 pages).
PCT International-Type Search Report for SE Application No. ITS/SE14/00257 dated May 29, 2015 (7 pages).
Chinese Office Action dated Dec. 7, 2018 for CN Application No. 201580073683.6 (English translation, 14 pages).

*Primary Examiner* — Sujoy K Kundu
*Assistant Examiner* — Terence E Stifter, Jr.
(74) *Attorney, Agent, or Firm* — Eversheds Sutherland (US) LLP

(57) ABSTRACT

The present invention relates to a method for performing liquid chromatography purification of one or more target molecules from a sample comprising: providing an eluent flow having one or more target molecules, measuring an output parameter indicative of the content of the one or more target molecules in the eluent flow, storing output parameter data, and dividing the eluent flow into consecutive eluent fractions, dividing the output parameter data into corresponding data fractions, in each data fraction obtaining a value indicative of characteristic behavior of the measured output parameter, identifying trends in the measured output (Continued)

parameter based upon the obtained value in consecutive data fractions, and identifying peak(s) in the measured output parameter correlated to eluent fractions based upon the identified trends, whereby information of identified peak(s) and correlated eluent fraction(s) can be presented and purified sample(s) from the eluent may be collected.

21 Claims, 10 Drawing Sheets

(51) Int. Cl.
  *G01N 30/82*  (2006.01)
  *B01D 15/10*  (2006.01)
(52) U.S. Cl.
  CPC ......... *G01N 30/8644* (2013.01); *B01D 15/10* (2013.01); *B01D 15/24* (2013.01)

(56) References Cited

U.S. PATENT DOCUMENTS

| | | | |
|---|---|---|---|
| 6,694,265 | B2 | 2/2004 | Gorenstein |
| 7,566,395 | B2 | 7/2009 | Lundblad et al. |
| 7,862,724 | B2 * | 1/2011 | Osaka .................. G01N 30/82 |
| | | | 210/198.2 |
| 2003/0102265 | A1 * | 6/2003 | Gandelheid .......... B01D 15/247 |
| | | | 210/656 |
| 2003/0222004 | A1 | 12/2003 | Michel et al. |
| 2011/0184658 | A1 | 7/2011 | Maruyama |
| 2011/0301865 | A1 | 12/2011 | Anderson et al. |
| 2013/0303732 | A1 | 11/2013 | Hewig, III et al. |
| 2016/0018370 | A1 | 1/2016 | Mito et al. |
| 2018/0120271 | A1 * | 5/2018 | Nyholm ............... B01D 15/247 |

* cited by examiner

METHOD AND APPARATUS FOR PERFORMING LIQUID CHROMATOGRAPHY PURIFICATION

CROSS REFERENCE TO RELATED APPLICATIONS

This application claims the priority benefit of PCT/EP2015/076704 filed on Nov. 16, 2015 which claims priority benefit of Swedish Application No. 1451375-8 filed Nov. 17, 2014. The entire contents of which are hereby incorporated by reference herein.

TECHNICAL FIELD

The present invention relates to a method for performing liquid chromatography purification as defined in the preamble of the independent claim 1. The invention also relates to a system for performing liquid chromatography purification.

BACKGROUND TO THE INVENTION

Biotechnological methods are used to an increasing extent in the production of proteins, peptides, nucleic acids and other biological molecules and compounds, for research purposes as well as in order to prepare novel kinds of drugs. Due to its versatility and sensitivity to the compounds, liquid chromatography is often the preferred purification method in this context. The term liquid chromatography embraces a family of closely related separation methods, which are all based on the principle that two mutually immiscible phases are brought into contact. More specifically, the target compound is introduced into a mobile (liquid) phase, which is contacted with a stationary phase.

The target compound will then undergo a series of interactions between the stationary and mobile phases as it is being carried through the system by the mobile phase. In brief, the concept of chromatography relates to the separation of target molecules from other molecules in a sample based on differences in their respective physical or chemical properties in relation to the mobile and the stationary phases.

Examples of commonly used chromatography purification techniques includes, but is not limited to: affinity chromatography (AC), Immobilized metal ion affinity chromatography (IMAC), flow-through chromatography, ion exchange chromatography (IEX), size-exclusion chromatography, reversed-phase chromatography (RPC), simulated moving-bed chromatography, hydrophobic interaction chromatography (HIC), gel filtration (GF), chromato-focusing and the like. Sometimes a purification protocol includes two or more purification steps of the using the same or different purification techniques.

The volume of the collected fractions is often different during different steps in a chromatographic run. During sample application, larger fraction volumes are collected as a safety measure in case the target protein was to pass straight through the column. The flow-through is collected in one or a few fractions corresponding to the volume of the sample applied and the subsequent wash. During elution, smaller fraction volumes are usually collected, and an eluting peak is normally divided into a number of eluent fractions in order to obtain pure protein from overlapping peaks.

To be able to analyze different parts of the peak, the fraction size during elution is usually set to a value smaller than the expected peak volume. When straight (sometimes called fixed) fractionation is used, the fraction collector will continuously switch tubes according to the set volume throughout the entire fractionation, as shown in FIG. 1a. To further increase the purity of the collected protein peaks, "peak fractionation" can be used. The UV/Vis detector is then used to determine when to start and stop peak fractionation, as shown in FIG. 1b. Straight fractionation and peak fractionation can also be combined during a run.

The fractionation delay volume is the volume between the UV/Vis detector's flow cell and the fraction collector. It is important that the correct delay volume is entered in the software.

The defined delay volume will be used by the system to calculate the time T1, which is when the peak reaches the fraction collector. T1 is used to synchronize the fractionation marks in the chromatogram with the tube switch of the fraction collector (see FIG. 2). At the start of the fraction collection, the delay volume is directed to waste or the first fractionation tube depending on which system is used. The delay volume depends on the tubing and components included in the flow path, and the delay volume is determined theoretically or experimentally by including the volume from all tubing and components between the absorbance detector and the fractionation tip.

Analytic peak integration and preparative peak integration of samples containing one or more target molecules using liquid chromatography are well known in the field. During analytic peak integration, or analytic run, the total amount of or ratio between one or more target molecules in the sample is determined by estimating the full peak relating to each target molecule and integrating said peak. During preparative peak integration, or preparative run, the object is to collect as pure portions of one or more molecules as possible.

Traditionally, the user has been forced to decide the type of peak integration before the sample is purified. If analytic peak integration is selected, an integration window is selected and a baseline established. Different techniques can be used to establish the baseline and also to identify the peaks within the integration window.

In preparative peak integration, the eluent flow (i.e. the output liquid flow of purified sample from the liquid chromatography purification) is divided into eluent fractions that are collected after the preparative run. Output parameter data is measured by the detector, the most common type is UV absorbance detector, and the data is displayed as a curve, also known as a chromatogram. Each peak is defined in the same way as for analytic peak integration. The user may manually selects which eluent fractions within the identified peak that are interesting to investigate, i.e. that contain the target molecule in an appropriate amount.

SUMMARY OF THE INVENTION

One object with the present invention is to provide a method with an improved process for purifying one or more target molecules from a sample compared to prior art.

The object may be achieved with a method for performing liquid chromatography purification of one or more target molecules from a sample as defined in the independent claim 1. The method comprises the steps: performing chromatography purifications of the sample providing an eluent flow having one or more target molecules; measuring an output parameter indicative of the content of the one or more target molecules in the eluent flow, storing output parameter data; and dividing the eluent flow into consecutive eluent fractions, and dividing the output parameter data into corresponding data fractions. The method further comprises the steps: in each data fraction, obtaining a value indicative of characteristic behavior of the measured output parameter, identifying trends in the measured output parameter based upon the obtained value in consecutive data fractions, and identifying peak(s) in the measured output parameter correlated to eluent fractions (203) based upon the identified trends, whereby information of identified peak(s) and correlated eluent fraction(s) can be presented and purified sample(s) from the eluent may be collected.

An advantage with the present invention is that the eluent fractions that correlate to a specific target molecule are determined with a higher purity compared to prior art methods.

Another advantage with the present invention is that the user more quickly comes to a decision on how to proceed with their work, e.g. which eluent fractions to collect for next step.

In an alternative embodiment of the invention, a target concentration of a selected molecule is obtained by: setting an extinction coefficient for each identified peak, setting the target concentration for the selected molecule with known extinction coefficient. Preparative peak integration using average output parameter levels for the data fractions is performed and the peak correlated with molecule is determined and data fractions within peak are selected to meet target concentration, and the molecule concentration and correlated data fractions are thereafter presented.

An advantage with the alternative embodiment is that a target molecule of a higher concentration can be collected compared to prior art methods.

Further objects and advantages will be apparent for a skilled person from the detailed description and the drawings.

DETAILED DESCRIPTION OF THE PREFERRED EMBODIMENTS

Figure 1A:
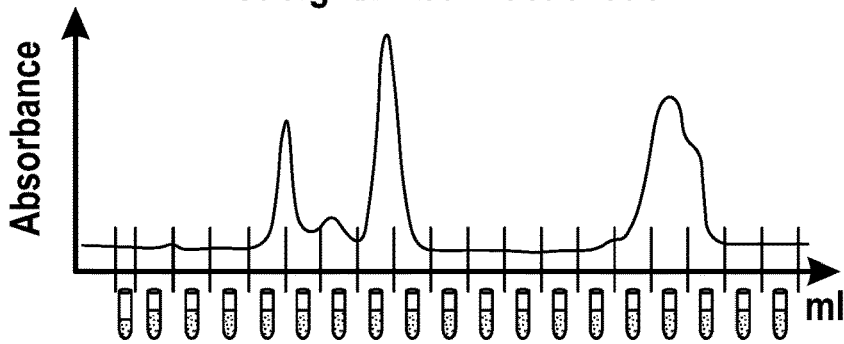
FIG. 1a illustrates straight fractionation and FIG. 1b illustrate peak fractionation according to prior art.

Throughout this specification and the claims the following terms are used in accordance with the following non-limiting definitions:

Liquid chromatography purification/Purification: The term liquid chromatography purification (sometimes only referred herein to as "purification") refers to any current or future chromatography-based act or process of purifying one or more target molecules from a sample, e.g. by the removal of impurities and/or other non-target molecules. Examples of liquid chromatography purification include, but are not limited to: affinity chromatography, immobilized metal ion affinity chromatography flow-through chromatography, ion exchange chromatography, size-exclusion chromatography, reversed-phase chromatography, simulated moving-bed chromatography, hydrophobic interaction chromatography, gel filtration, chromato-focusing. However, the scope of related terms like purifying, purifies, purified, pure, etc. are in no way limited in scope by this definition.

Liquid chromatography protocol: The term "liquid chromatography protocol" refers to a protocol defining the settings of experimental parameters for a chromatography purification process. A liquid chromatography protocol may comprise one or more chromatography purification steps, and may further be combined with other steps, like filtration and the like.

Target molecule: The term "target molecule" refers to the molecule to be purified and thus separated from one or more other molecules in a sample based on differences in their respective physical or chemical properties in relation to the mobile and the stationary phases. The target molecule may be a biomolecule, such as a protein, antibody, polypeptide, polynucleotide, DNA or the like.

Sample: The term "sample" refers to the liquid sample at least comprising the target molecule to be separated and thus purified. The sample may be any liquid comprising the target molecule, such as a biologically derived sample liquid, e.g. originating from a cell culture, a living organism, a body liquid or the like.

Chromatogram: The term "chromatogram" refers to a graphical representation of one or more output parameters as registered during at least a part of the chromatography purification. The chromatogram may present the output parameter as a function of time, accumulated volume or any other parameter relevant for the chromatography purification.

Eluent flow: The term "eluent flow" refers to the output liquid flow including purified target molecule(s) from the liquid chromatography purification.

Output parameter: The term "output parameter" refers to a registerable parameter that is indicative of the concentration or amount of a target molecule in the eluent flow of liquid chromatography purification. The output parameter may e.g. be a measurement of one or more properties in the output flow from chromatography purification and the output parameter(s) may be selected from, but are not limited to: UV absorbance at one or more wavelengths, conductivity, light scattering detection, fluorescence emission, mass-spectroscopy or the like.

Eluent fraction: Eluent fractions are the portions from the eluent flow being collected in the fraction collector.

Data fraction: Data fractions contain the stored data from the measurement of the output parameter indicative of the content of the target molecules and are correlated with the eluent fractions.

Analytic run: The purpose of analytic run, or analytic peak integration, is to determine the total amount of every present molecule in a sample.

Preparative run: The purpose of preparative run, or preparative peak integration, is to collect as pure portions of one or more molecules from a sample as possible.

Content: The terminology "content of target molecules" is used in this description to include concentration and/or amount of a target molecule.

Through-out this description, the inventive features are exemplified using an UV absorption detector, but the inventive concept should not be limited to this. Other types of detector can be used to measure output parameters indicative of the content of target molecules.

When performing preparative purifications, the main goal is to collect a purified sample for further work, e.g. research, process optimization or production. It will always be a trade-off between purity and amount.

Analysis of liquid chromatography purification results often includes analytic or preparative peak integration of an eluent flow having one or more target molecules. An output parameter indicative of the concentration of the one or more target molecules/proteins in the eluent flow, such as absorbance, is measured and output parameter data is stored. The stored output data points define a chromatogram.

Analytic peak integration is performed based upon the measured output parameter, such as an UV signal indicating UV absorbance, since the area of a peak in the chromatogram is proportional to the content of purified molecule. However, for preparative peak integration, the eluent flow is divided into consecutive eluent fractions, and the output parameter data is divided into corresponding data fractions. The main focus for preparative peak integration is on collecting the purified eluent fractions included in a peak. The amount of purified molecule in these eluent fractions is of crucial importance and cannot be obtained from analytic peak integration.

The present invention provides means for "one click preparative evaluation" based upon automatic identification that a chromatography purification is of preparative nature, wherein preparative peak integration is predefined and the chromatogram is analyzed to identify one or more peaks corresponding to the target molecule(s) and which correlated eluent fractions that contain said target molecule(s). In one embodiment, a peak-fraction-selection is presented, and the corresponding volumes of target molecule(s) in the corresponding eluent fractions is calculated and presented. As a result, the amount of molecule/protein in each eluent fraction can be estimated and the user is assisted in the decision on which eluent fractions to use for the next step in their work. However, the presented result from the preparative run is an estimation of the eluent fractions correlated to a peak. The user is free to change the correlation between the peak and the eluent fractions, i.e. add or remove eluent fractions within the peak, and thus the content of the target molecules, as will be discussed more in detail with reference to FIGS. 7a to 7d.

The basic concept of the inventive method is to detect peaks correlated with eluent fractions when performing preparative peak integration. In one embodiment, the peak detection is based upon a value indicative of the characteristic behavior in each data fraction instead of the measured output parameter itself. The value is in one embodiment implemented as the average value of output parameter in each data fraction as described in more detail below. Since the eluent flow is collected in predetermined fractions, the selection of which fraction(s) contains a target molecule, i.e. belongs to a peak in the output parameter chromatogram, is limited to the fraction boundaries. Hence the detected peak limits, start of peak and end of peak, are adapted to snap to eluent fraction boundaries.

In a further embodiment, the method includes automatic identification of whether analytic or preparative peak integration should be performed based upon the presence of eluent fractions or not. If the eluent flow is not divided into eluent fractions, analytic peak integration will be selected, otherwise preparative peak integration will take place. However, the user interface allows for the user to change mode of operation from preparative to analytical integration also when the eluent flow is divided into eluent fractions, as will be discussed more in detail with reference to FIGS. 7a to 7d.

Figure 3:
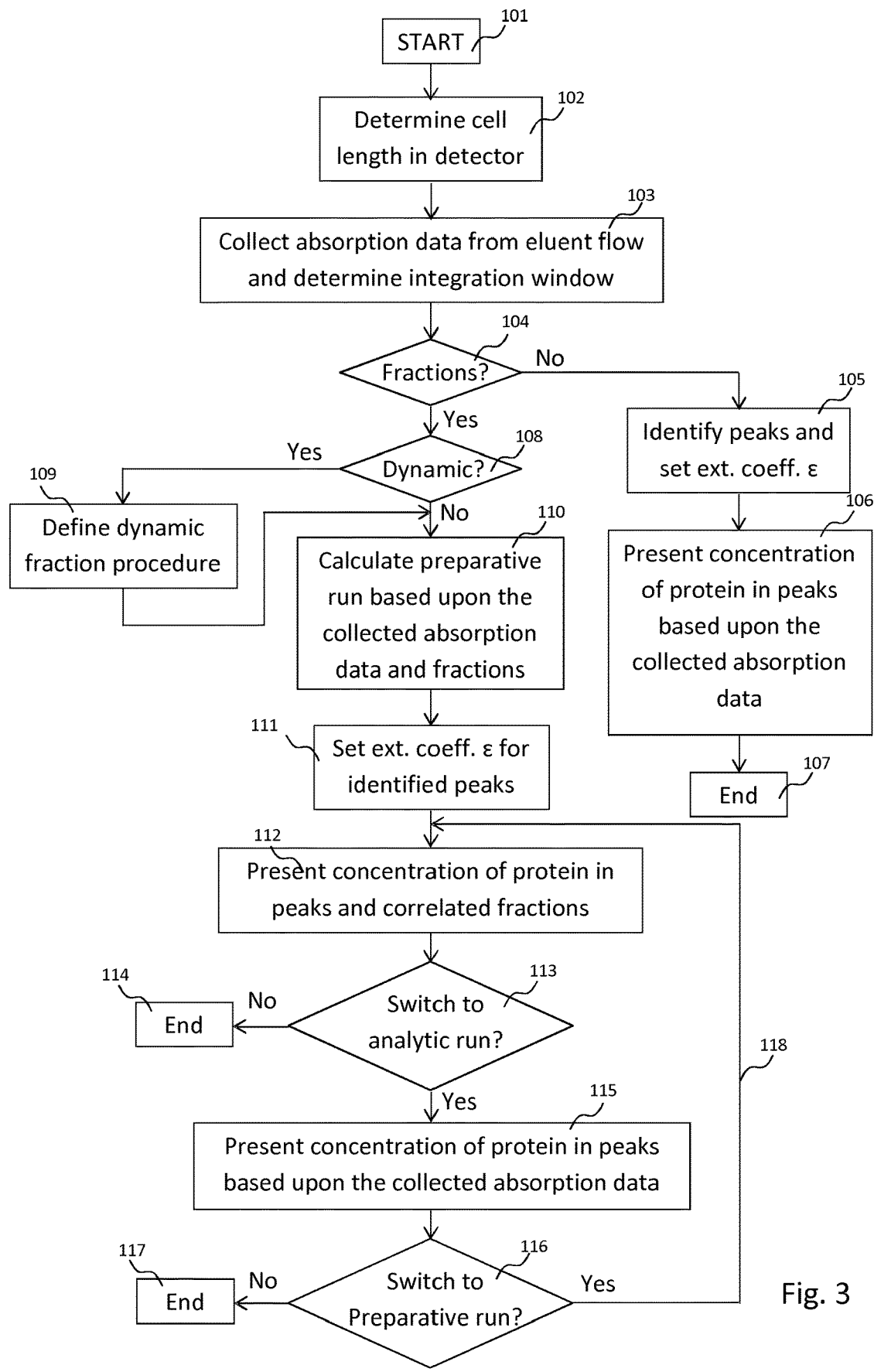
FIG. 3 shows a flow chart describing a process for performing liquid purification according to the invention.

FIG. 3 shows a flow chart describing one embodiment of a process for performing liquid purification according to the invention. In order to illustrate the invention UV absorbance, measured in an UV detector, is used to indicate the concentration of one or more target molecules from a sample. The sample is subject to chromatography purification to provide an eluent flow comprising the one or more target molecules.

In FIG. 3, the process starts 101 and the cell length in the UV detector is determined 102. This step may be omitted if using other types of detectors than UV detectors. This can be achieved manually by entering the required parameter, or automatically as known for a skilled person in the art. The cell length is required to estimate the concentration of the target molecule(s), as described below.

$$A = f(conc.) = \varepsilon \cdot l_{UV} \cdot conc.$$

A is the absorbance, conc. is concentration of a molecule, $\varepsilon$ is extinction coefficient of the molecule, and the $l_{UV}$ is the illuminated length in the UV detector.

Output parameter data, in this example UV absorbance signal, indicative of one or more target molecules in the eluent flow is measured and stored, and optionally the integration window is determined in 103. If an integration window is selected it may be manually selected or automatically set according to the following steps:

1) Set a default integration window to include the measured output parameter data, for instance by setting the start of the default integration window to coincide with the first measured output parameter and the end of the default integration window to include the last measured output parameter.

2) Examine the number of output parameter data points within the default integration window, and if less than a minimum number of data points, e.g. twenty, the process is terminated.

3) Find the retention for the first injection of the eluent. The first injection is defined as a first event in the chromatogram, and the start of the integration window is adjusted to coincide with the first event if the first injection is found.

4) Find the retention for the last eluent fraction, and adjust the end of the integration window to include the last event if found. The last eluent fraction is defined as the last event in the consecutive eluent fractions that is not a waste position 5) If no "last eluent fraction" is found, then find the end of the elution phase, and adjust the end of the integration window to include the end of the elution phase if found. The end of the elution phase is defined as the last output parameter data containing non-waste substances.

6) Examine the number of output parameter data points within the adjusted integration window, and if less than the minimum number of data points the integration window is determined to be the default integration window.

A baseline is set for the integration window to compensate for signal not related to the sample/target molecule which is known for a skilled person in the arts.

Next, an automatic decision is made 104 to perform analytic peak integration if no eluent fractions can be found. Peaks are identified and the extinction coefficient E for the molecule/protein within each peak is set in 105 and the concentration of molecule/protein in each peak is presented based upon the stored output parameter data, similar to the illustration in FIG. 7a. This process is well established in the art and therefore not described in more detail.

Figure 1B:
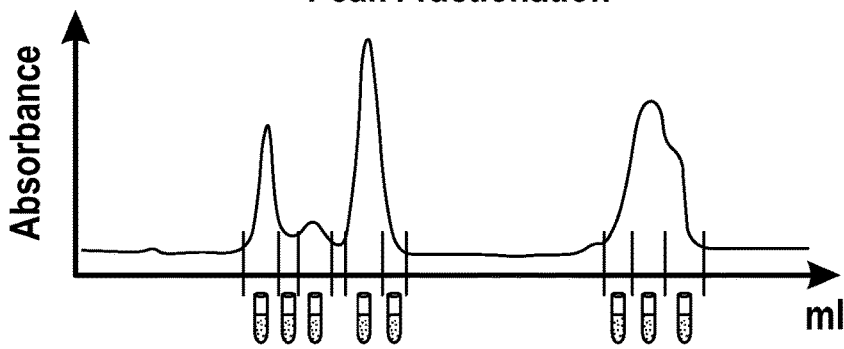
Figure 2:
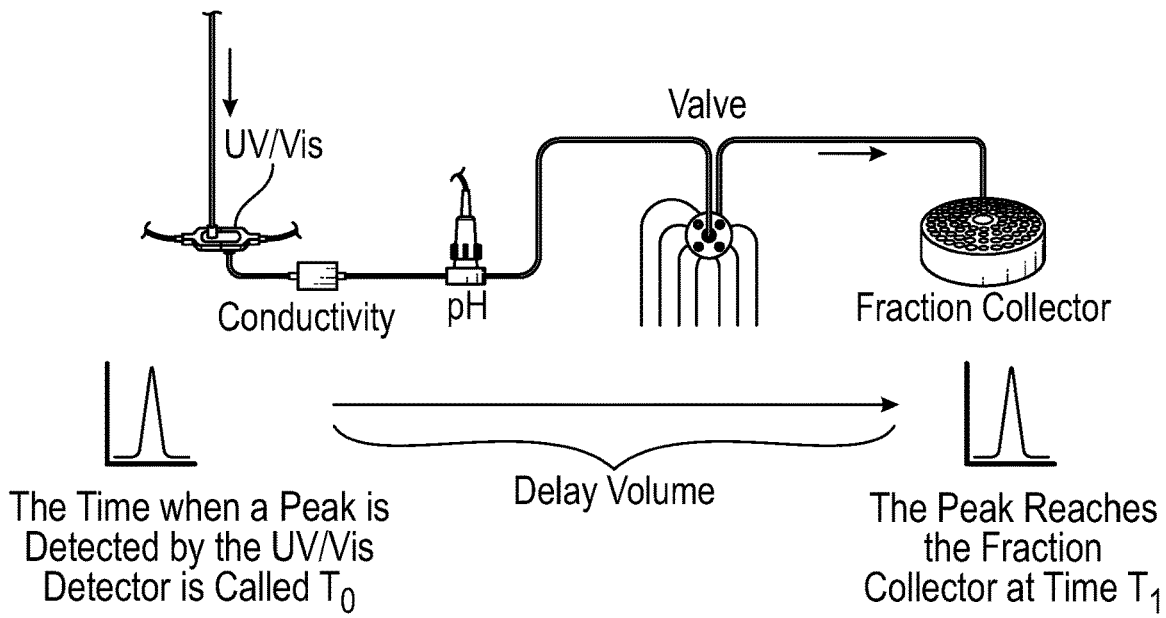
FIG. 2 illustrates the delay of the eluent flow between the detector and the fraction collector in a prior art system.

However, if the eluent flow is divided into eluent fractions, the flow continues to 108, where the fraction size of each consecutive eluent fraction is defined. Eluent fractions with predetermined size, as illustrated in connection with FIGS. 1a and 1b, for all eluent fractions is normally selected and used when calculating the preparative peak integration in 110. As an alternative to equal fraction size, a dynamic fraction size can be used and in 109, the dynamic fraction procedure is defined.

Dynamic fraction size can be defined in several ways. One variant is described in connection with FIG. 8. The basic principle of the dynamic fraction procedure is to keep track of the varying size of consecutive eluent fractions, and this is achieved by: determining trig start position(s) and trig stop position(s) based upon the previously measured output parameter, and changing the eluent fraction size at each trig start position and restoring the fraction size at each trig stop position.

Figure 6:
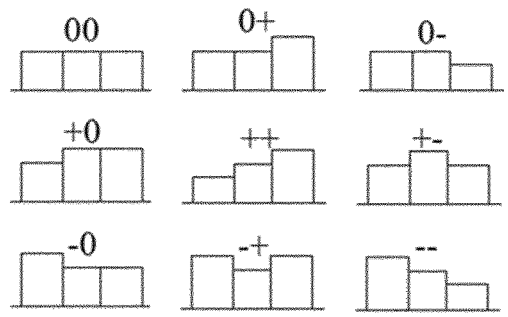
FIG. 6 illustrates the concept of derivative signature to identify valleys in measured output parameters, such as UV absorbance.
Figure 8:
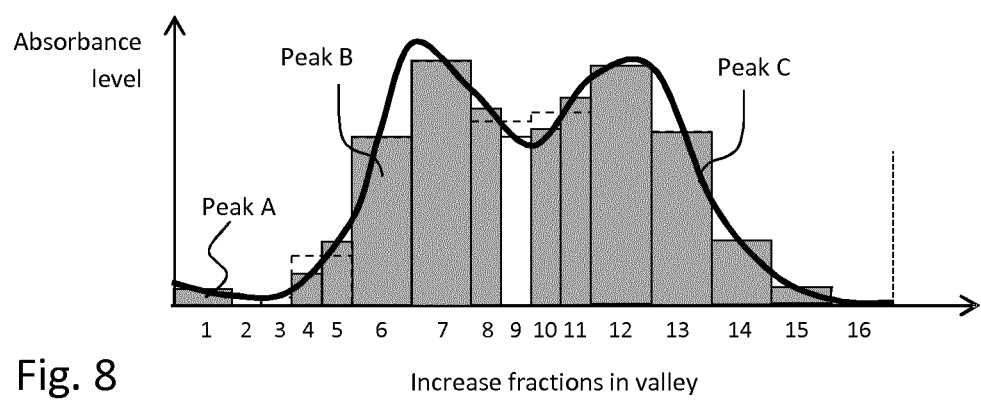
FIG. 8 illustrates an alternative embodiment of preparative peak integration.

The eluent fraction size may be FIG. 8 reduced at each trig start position, as illustrated in FIG. 6. The object with using dynamic fraction size is to increase the amount of each target molecule in each identified peak by increasing the resolution (reduced eluent fraction size) without the risk of contaminating the target molecule.

Figure 4:
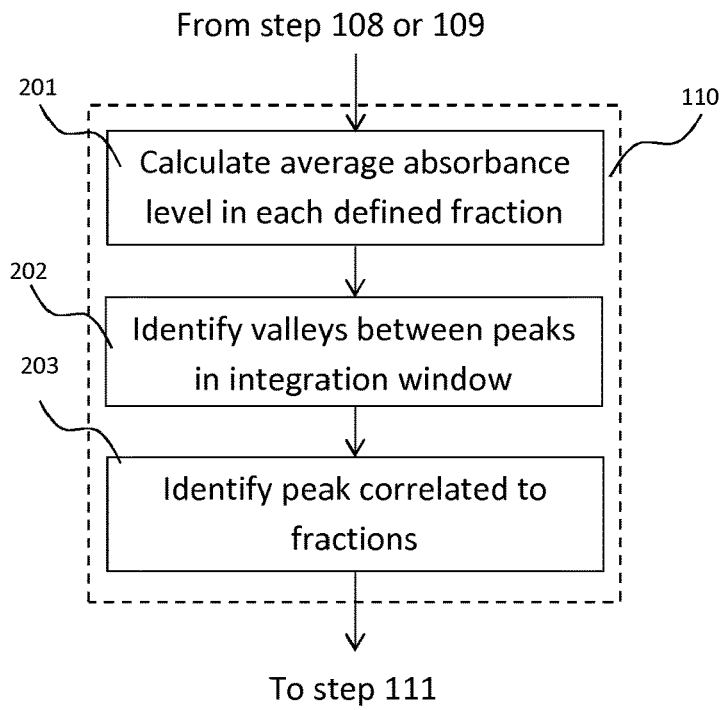
FIG. 4 shows a flow chart describing the step of preparative peak integration in the process described in connection with FIG. 3.

When the dynamic fraction procedure is defined in 109, the process of calculating preparative peak integration (also known as preparative run) is performed in 110, see description in connection with FIG. 4 for details.

In order to be able to calculate the concentration for molecules/proteins when using an UV detector, the extinction coefficient for each molecule/protein must be assigned to the identified peak 111. The result from the preparative run, i.e. content of molecule/protein in peaks and correlated eluent fractions, is thereafter presented 112, as illustrated in FIGS. 7b, 7c and 7d respectively.

Figure 7A:
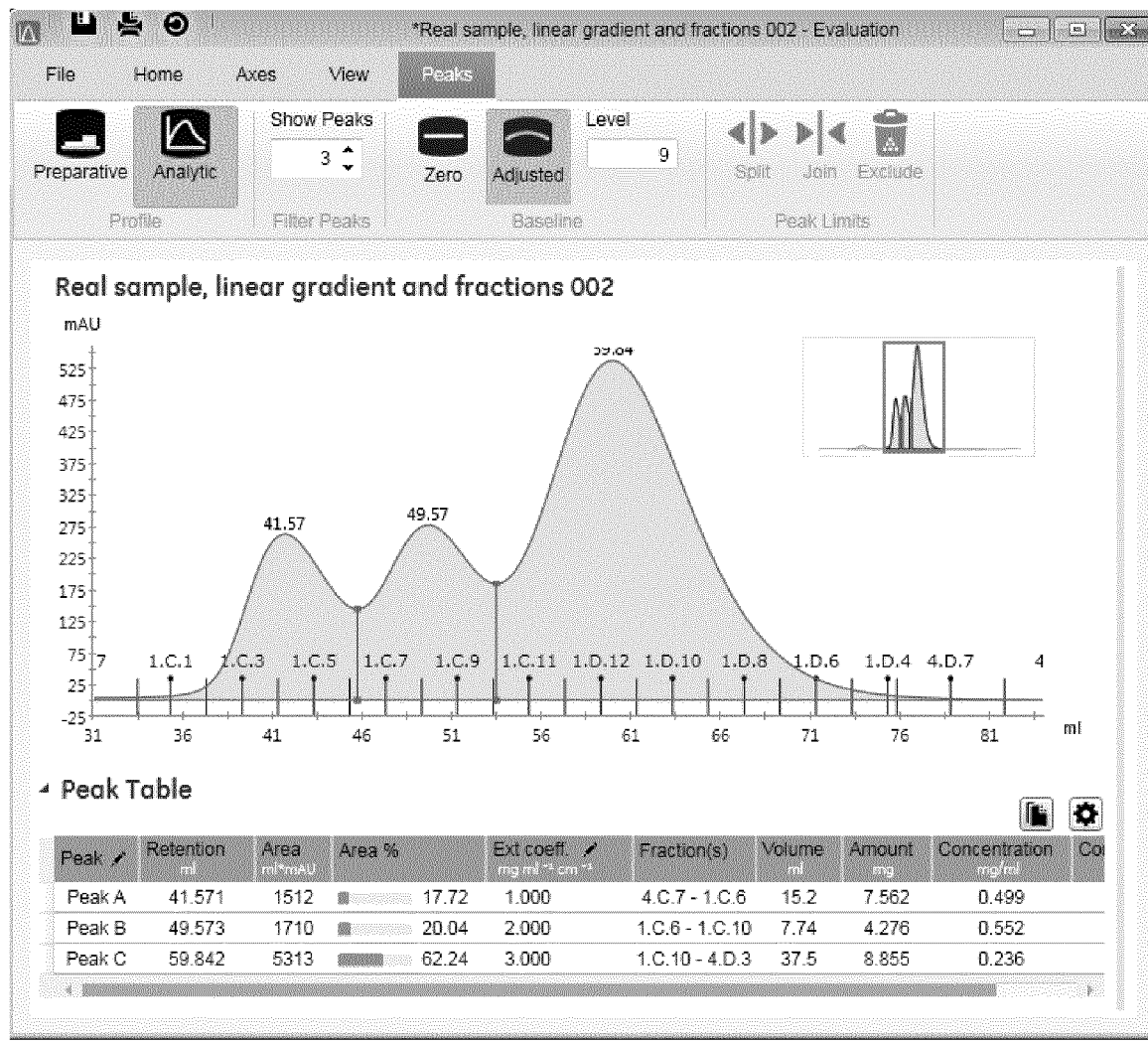
FIGS. 7a and 7b illustrate the difference between analytic and preparative peak integration.
Figure 7B:
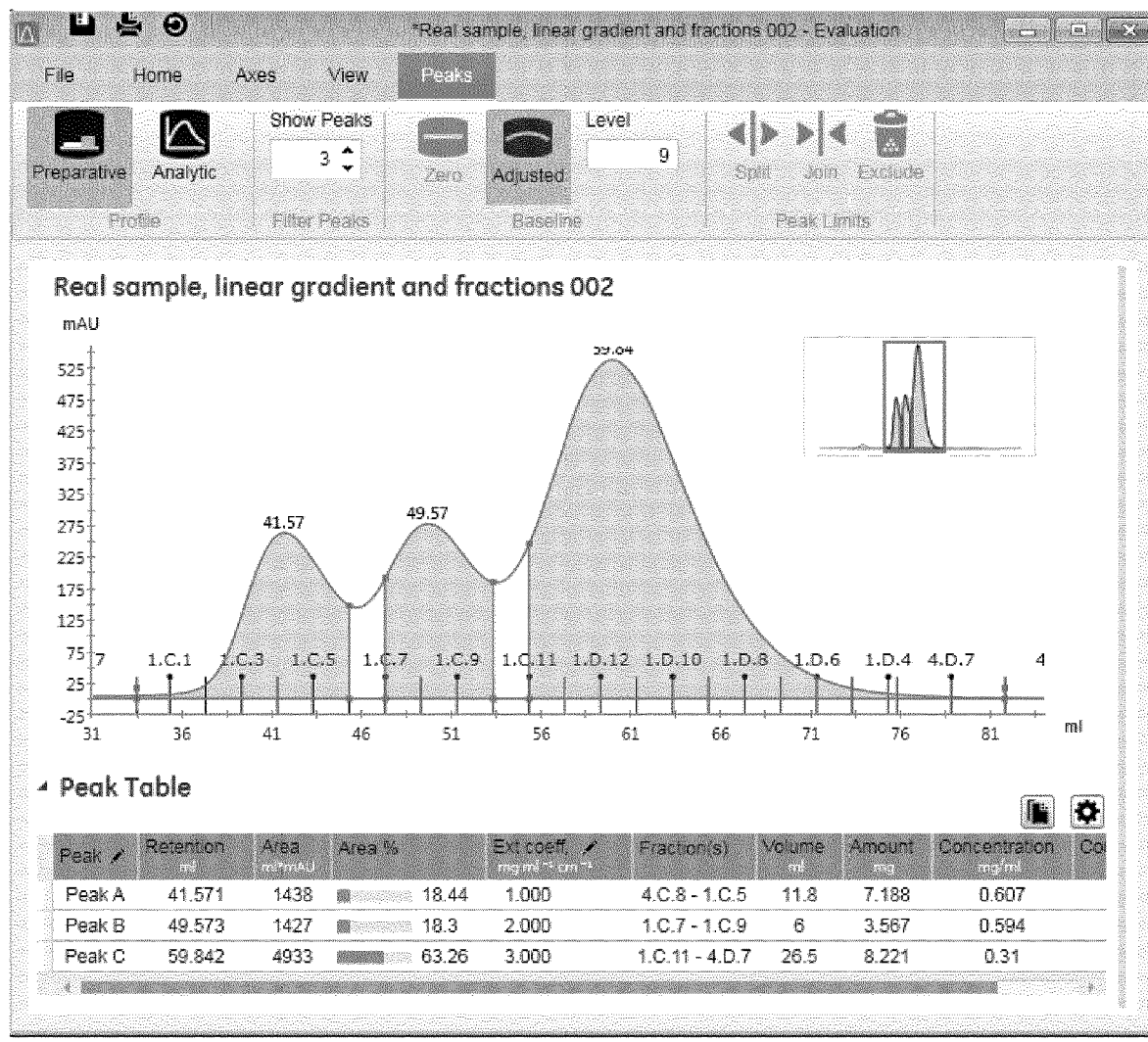
Figure 7C:
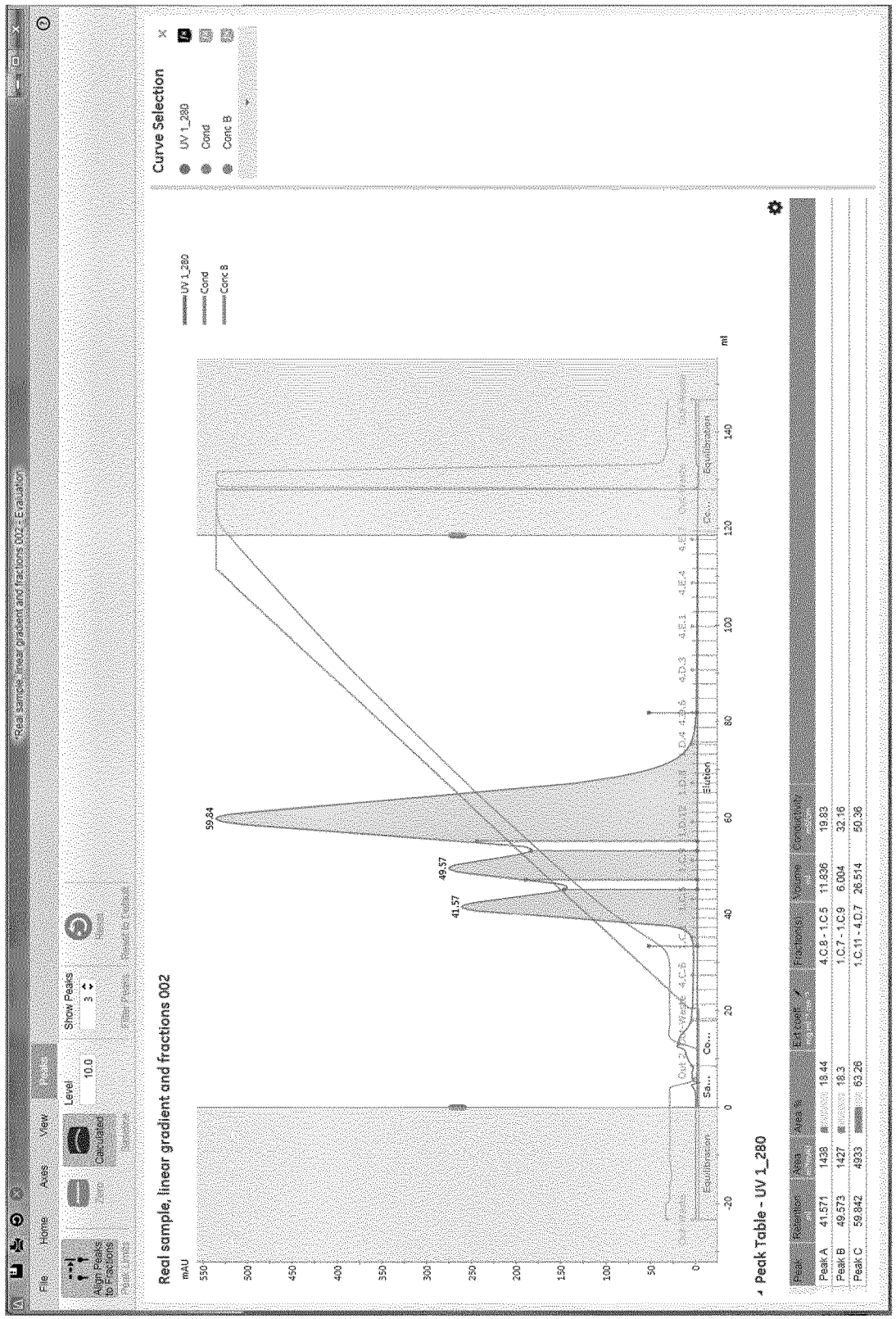
FIGS. 7c and 7d show an alternative GUI where the concept of the invention is implemented.
Figure 7D:
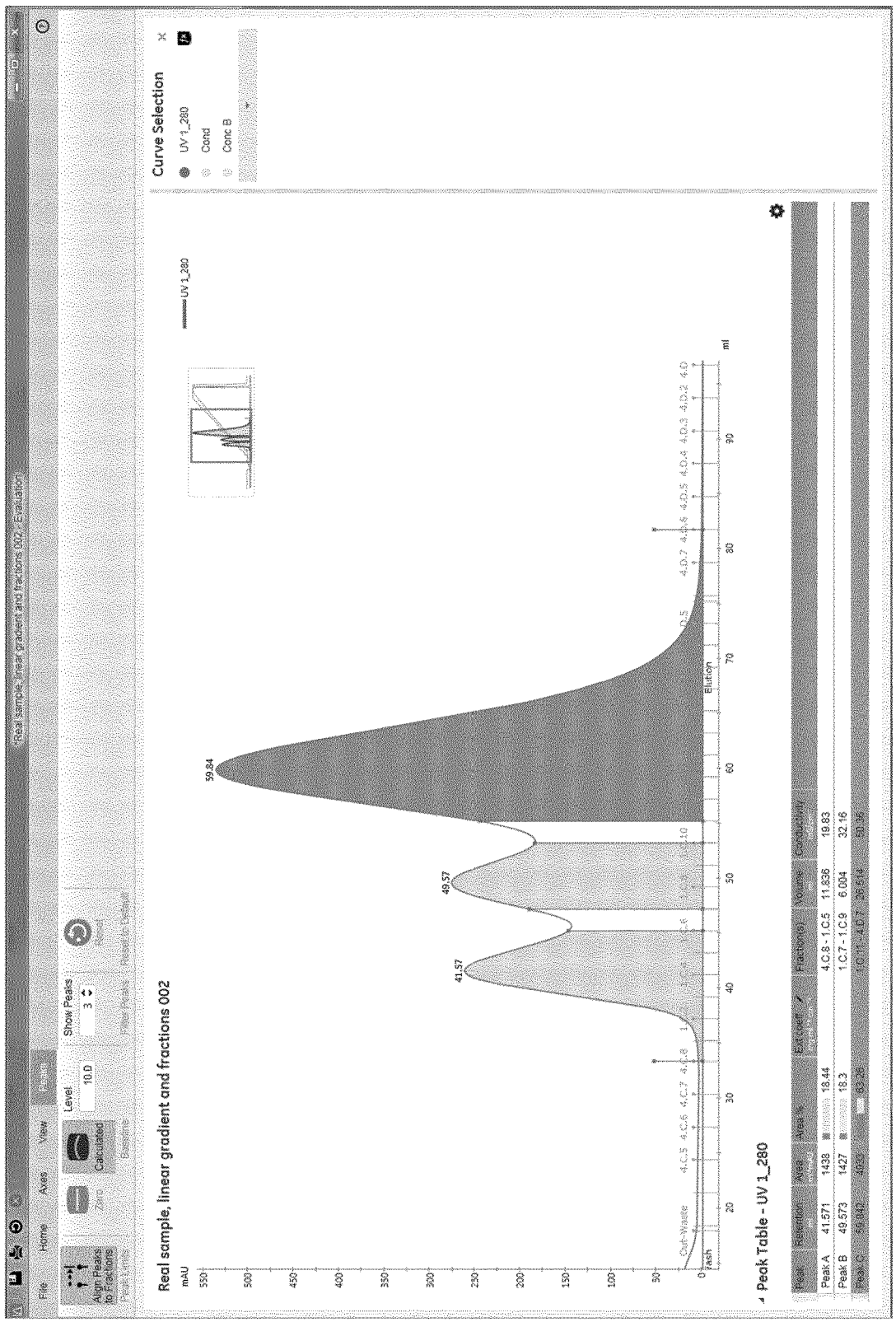

An advantage with the inventive method is that it is possible to switch from preparative run to analytic run if desired 113, since all the necessary information to present the result from analytic peak integration within the selected integration window is available 115, as illustrated in FIG. 7a. The presentation comprises content of molecules in peaks based upon the measured output parameter data. If the user does not want to view the results from the analytic run, the process ends 114.

In contrast to when the results are presented directly from an analytic run, 106, it is possible to switch 116 from the presentation of the results from the analytic peak integration 115 back to the results of the preparative peak integration 112 if desired, as indicated by 118. If not the process ends 117.

In FIG. 4, the process for calculating the preparative peak integration 110 is described. For illustration purposes, the output parameter is selected to be absorbance. The inventive concept comprises obtaining a value indicative of the characteristic behavior of the measured absorbance in each data fraction. Throughout the specification, this feature is exemplified by calculating an average absorbance level in each defined data fraction based upon the measured absorbance 201.

Trends in the measured absorbance, such as valley(s) between peaks, are then identified based upon the calculated average absorbance level 202. One way to identify the trends is by determining data fractions being end of peak and determining data fractions being start of new peak. The process of identifying trends (e.g. valleys) is described in more detail in connection with FIG. 9.

When trends (valleys) in the measured absorbance have been identified, peaks correlated to each eluent fraction are identified based upon the identified trends 203.

Figure 5:
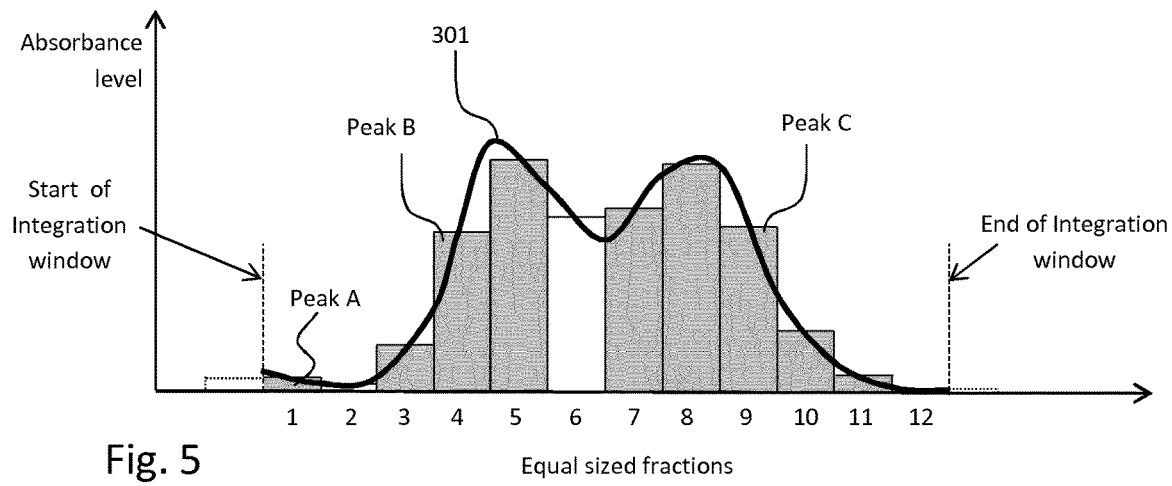
FIG. 5 illustrates a first embodiment of preparative peak integration as described in FIG. 4.

FIG. 5 illustrates a first embodiment of preparative peak integration as described in connection with FIG. 4. Absorbance, which is indicative of the concentration of target molecules in the eluent flow, has been measured and a chromatogram 301 has been plotted based upon the stored absorbance data. The eluent flow has been divided into eluent fractions with predetermined size within an integration window, and the absorbance data is divided into corresponding data fractions. Eluent fractions "1"-"12" are included in the integration window (illustrated by dashed lines).

Three peaks have been identified, peak A, peak B and peak C, based upon the identified trends (e.g. valleys), corresponding to data fractions 2 and 6. Peak A correlate to eluent fraction 1, peak B correlate to eluent fractions 3-5 and peak C correlate to eluent fraction 7-12. The process of identifying the valley requires the introduction of a feature called derivative signature that makes it possible to determine the short term trend between adjacent data fractions, as described in connection with FIG. 6.

FIG. 6 illustrates the concept of derivative signature to identify trends in measured output parameters, such as UV absorbance. Three different symbols (0,+,−) referred to as "derivative signs" are used to illustrate the "derivative signature" of each fraction. The derivative signature is a relative signature of the slope of the registered chromatogram during each fraction. The derivative signature is comprised of two derivative signs, wherein the first represents indicates the slope of the fraction with respect to the preceding fraction and the second with respect to the following fraction. A threshold value is also calculated for determining a difference in average output parameter level between adjacent data fractions:

0 the derivative sign between two adjacent data fractions is zero if the difference in average output parameter level is lower than the threshold value.

If the difference in average output parameter level between adjacent data fractions is higher than said threshold value, then:

+ the derivative sign is positive if the average output parameter level is higher in following data fraction compared to the average output parameter level of the present data fraction.

− the derivative sign is negative if the average output parameter level is lower in following data fraction compared to the average output parameter level of the present data fraction.

The threshold value may be arbitrary selected and one option is to select the threshold value to be less than 5%, e.g. 1%, 0.5% or 0.1%, of the difference between the highest and the lowest calculated average output parameter level for the data fractions within said integration window.

FIG. 6 further shows nine possible constellations of the three symbols used in determining the derivative signature of consecutive data fractions. The center data fraction is considered to be the present data fraction, the data fraction to the left is the preceding data fraction, and the data fraction to the right is the following data fraction.

The derivative signature comprises two symbols and they can indicate three different states: "end of peak", "start of new peak" and "others".

End of Peak

A derivative signature comprised of two different derivative signs wherein the first is equal to—and the second is not equal to—(−0 and −+) indicate "end of peak". In a main embodiment, the preceding data fraction is the last data fraction in a peak when the derivative sign of the present data fraction is negative in relation to the preceding data fraction and the derivative sign is positive or zero (i.e. non-negative) in relation to the following data fraction. I.e. the "end of peak" is detected when the average output parameter level of the present data fraction is lower in relation to the average output parameter level of the preceding data fraction and when the average output parameter level of the present data fraction is lower or equal in relation to the average output parameter level of the following data fraction.

The main embodiment is illustrated in FIG. 5, wherein the derivative signature of data fraction "2" is −+ and data fraction "1" is the last data fraction in peak A and the derivative signature of data fraction "6" is −+ and data fraction "5" is the last data fraction in peak B.

In an alternative embodiment, the present fraction is the last data fraction in a peak when the derivative sign of the present data fraction is negative in relation to the preceding data fraction and the derivative sign is positive or zero (i.e. non-negative) in relation to the following data fraction.

The alternative embodiment can be illustrated in connection with FIG. 5, wherein the derivative signature of data fraction "2" is −+ and data fraction "2" should be considered as the last data fraction in peak A and the derivative signature of data fraction "6" is −+ and data fraction "6" should be considered as the last data fraction in peak B.

Start of New Peak

A derivative signature comprised of two different derivative signs wherein the latter is equal to + and the former is not equal to +(0+ and −+) indicate "start of new peak". The following data fraction is the first data fraction in a new peak, unless the present data fraction is within a peak, when the derivative sign of the present data fraction is zero or negative (i.e. non-positive) in relation to the preceding data fraction and the derivative sign of the present data fraction is positive in relation to the following data fraction. I.e. the "start of new peak" is detected when the average output parameter level of the present data fraction is lower or equal in relation to the average output parameter level of the preceding data fraction and when the average output parameter level of the present data fraction is lower in relation to the following data fraction.

This is illustrated in FIG. 5, wherein the derivative signature of data fraction "2" is −+ and data fraction "3" is the first data fraction in peak B and the derivative signature of data fraction "6" is −+ and data fraction "7" is the first data fraction in peak C.

Others

For the other possible constellations, no "end of peak" or "start of new peak" can be detected. The data fractions situated between a "start of new peak" and "end of peak" is considered to belong to the same peak. This is exemplified in FIG. 5 as follows: data fraction "3" is start of new peak (as described above) and data fraction "5" is end of peak (as described above). This yields that data fraction "4" belongs to the same peak, and thus peak B correlates to eluent fractions "3", "4" and "5".

Special consideration needs to be taken concerning the first data fraction "1" and the last data fraction "12". Since no data is available to calculate the complete derivative signature for data fraction "1", it is assumed that the difference between the present data fraction and the preceding data fraction is zero (as indicated by the dotted lines to the left of the start of the integration window in FIG. 5).

The same applies for the last data fraction "12", wherein no data is available to calculate the complete the derivative signature for data fraction "12". It is assumed that the difference between the present data fraction and the following data fraction is zero (as indicated by the dotted lines to the right of the end of the integration window in FIG. 5).

The process for identifying the peaks in FIG. 5 is illustrated in table 1.

TABLE 1

| Data fraction | Derivative signature | trigger | state |
|---|---|---|---|
| 1 | 0− | end of peak | peak |
| 2 | −+ |  | valley |
| 3 | ++ | start of peak | peak |
| 4 | ++ |  | peak |
| 5 | +− | end of peak | peak |
| 6 | −+ |  | valley |
| 7 | ++ | start of peak | peak |
| 8 | +− |  | peak |
| 9 | −− |  | peak |
| 10 | −− |  | peak |
| 11 | −− |  | peak |
| 12 | −0 | end of peak | peak |

Figure 9:
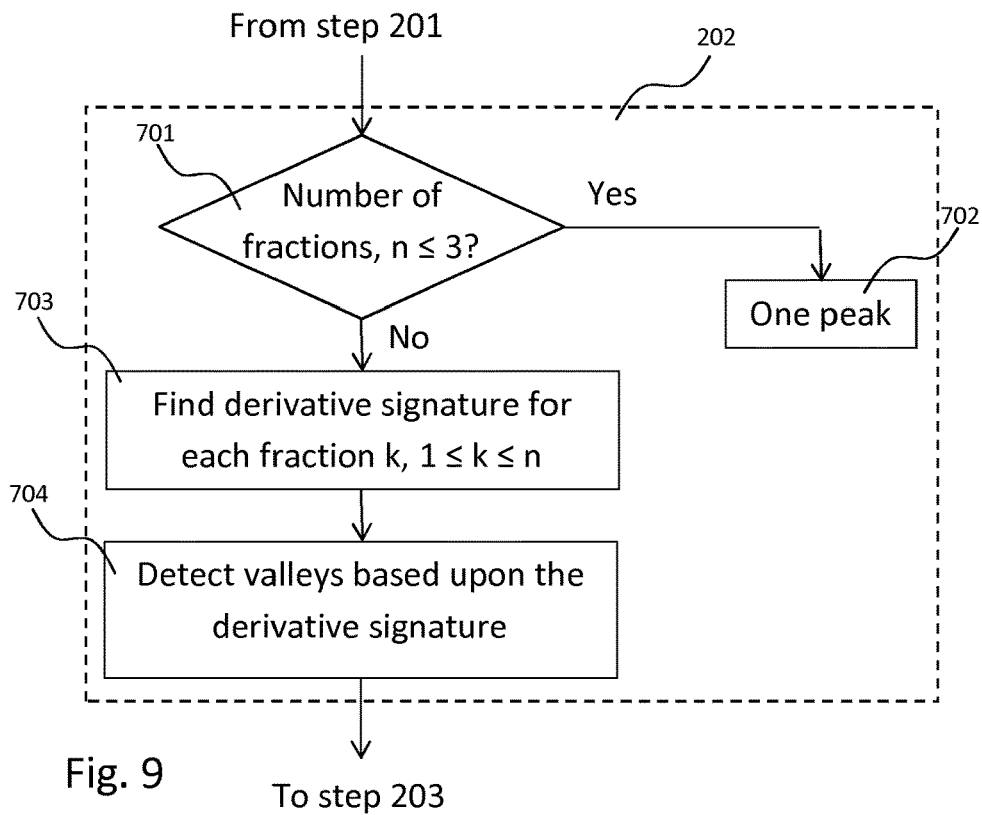
FIG. 9 shows a flow chart describing the process of identifying valleys between peaks in an integration window.

FIG. 9 shows a more detailed flow chart describing the process of identifying trends, e.g. valleys between peaks, in an integration window 202. First the number of fractions is investigated 701. If the number of data fractions is three or less (number of data fractions 3) then all data fractions are considered to belong to the same peak 702. However, when the number of data fractions within the integration window is ensured to be more than three in 701, the process of finding the derivative signature for each data fraction is initiated by comparing the average output parameter level of the data fraction with the average output parameter level of adjacent data fractions 703, and using the derivative signature to determine end of peak and start of new peak to identify each valley 704.

The process of finding the derivative signatures of consecutive data fractions "k" can be described in the following steps, wherein the first data fraction is "1" and the last data fraction is "n" (1≤k≤n):

1) Assume that the first peak starts with the first data fraction "1".

2) If the derivative signature for the next data fraction "2" is −0 or −+, then data fraction "1" was the last data fraction in the first peak, but if the derivative signature for the following data fraction "2" is 0+, then the start of the first peak is data fraction "2".

3) The derivative signature 0+ indicates that the following data fraction is the start of a new peak, unless the present data fraction is already within a peak.

4) The derivative signature −0 indicates that the preceding data fraction is the last in a peak.

5) The derivative signature −+ indicates that the preceding data fraction was the last in a peak (or alternatively, the present data fraction is the last in a peak) and that the following data fraction is the first data fraction in a new peak.

6) For the last data fraction, a final check is made. If the last data fraction "n" is within a peak, then data fraction "n" is considered to be the last data fraction in the peak.

The peak(s) is/are identified and correlated to consecutive data fractions positioned between "start of new peak" and "end of peak" and within the integration window.

FIGS. 7a and 7b shows an example of a graphical user interface (GUI) implemented to facilitate the workflow and to illustrate the concept of the present invention. FIG. 7a shows the GUI in "analytic" mode which is illustrated in that the "Analytic" button in the top left corner is highlighted. In the analytic mode, peak boundaries are identified at the lowest points in the respective valleys as illustrated by vertical lines extending from the lowest point in the valley to the x-axis. It should be noted that the peak boundaries are not aligned to the fraction indications on the x-axis. Said peak boundaries are then used to calculate the analytic composition of the sample, as presented in table 2a below. FIG. 7b shows the GUI in "Preparative" mode which is illustrated in that the "Preparative" button in the top left corner is highlighted. In the preparative mode, peak boundaries are identified as disclosed in this disclosure and are illustrated by vertical lines extending from the chromatogram to the x-axis. It should be noted that the peak boundaries in preparative mode are aligned to the fraction indications on the x-axis. As previously mentioned, said peak boundaries are then used to calculate the preparative composition of the sample, as presented in table 2b below. Three peaks, A, B and C are visible in the graph and the data from the graph are presented in table 2a and 2b below.

TABLE 2a

Analytic peak table

| Peak | Retention ml | Area ml · mAU | Area % | ε | eluent fraction | Vol. ml | Amount mg | Conc. mg/ml |
|---|---|---|---|---|---|---|---|---|
| A | 41.571 | 1512 | 17.72 | 1 | 4C7-1C6 | 15.2 | 7.562 | 0.499 |
| B | 49.573 | 1710 | 20.04 | 2 | 1C6-1C10 | 7.74 | 4.276 | 0.552 |
| C | 59.842 | 5313 | 62.24 | 3 | 1C10-4D3 | 37.5 | 8.855 | 0.236 |

TABLE 2b

Preparative peak table

| Peak | Retention ml | Area ml · mAU | Area % | ε | eluent fraction | Vol. ml | Amount mg | Conc. mg/ml |
|---|---|---|---|---|---|---|---|---|
| A | 41.571 | 1438 | 18.44 | 1 | 4C8-1C5 | 11.8 | 7.188 | 0.607 |
| B | 49.573 | 1427 | 18.3 | 2 | 1C7-1C9 | 6 | 3.567 | 0.594 |
| C | 59.842 | 4933 | 63.26 | 3 | 1C11-4D7 | 26.5 | 8.221 | 0.31 |

The important difference here is that each peak contains less volume and less amount of the respective molecule in the preparative integration, but the concentration is higher.

FIGS. 7c and 7d disclose an alternative GUI wherein the concept of the present invention is implemented. In FIG. 7c the full chromatography purification process is illustrated, and wherein the non-shaded central area illustrates the integration window that has been determined in accordance to above. It should be noted that the integration window boundary lines comprises adjustment handles that can be used to adjust the boundaries, e.g. by means of a pointer device or the like. FIG. 7c further shows a graph illustrating an elution gradient profile, e.g. a salt profile, and the corresponding conductivity measurement. In FIGS. 7c and 7d, the GUI is shown in preparative mode as indicated by the button "Align Peaks to Fractions" in the upper left corner is selected and highlighted. FIG. 7d is a zoomed view of the section of the chromatogram in FIG. 7c defined by the integration window. In FIG. 7d, the full chromatogram of FIG. 7c is disclosed as a miniature graph in the upper right section of the chromatogram.

In FIGS. 5, 7b-7d and the associated disclosure it is assumed that the fraction determined to correspond to a valley by the method in accordance with the present invention is indicated as not belonging to a peak. This is often a valid assumption and may therefore be implemented as a preselected option in accordance with one embodiment of the present invention. However in some situations said "valley fraction" may be desirable to include in either one of the adjacent peaks as identified. In one embodiment, the user may address such a situation and move the peak boundaries manually, but as previously mentioned, the peak boundaries are preferably arranged to snap to the fraction boundaries. In one embodiment, the method comprises a step of estimating the composition of an intermediate "valley fraction" as determined by the above steps and automatically determine if said fraction should be assigned to either one of the adjacent peaks or if it should be excluded as a valley fraction. Said determination may be performed by finding the analytic peak boundary, calculating the corresponding relative composition of the fraction based on the analytic peak boundary, and compare the resulting composition to a predetermined threshold value. Said threshold value may any value that indicates that the fraction comprises a substantial proportion of a desired target molecule, e.g. 75% or the like.

FIG. 8 illustrates an alternative embodiment of preparative peak integration using dynamic eluent fractions wherein the process is based upon the use of equal data fraction size for the eluent flow when determining the dynamic eluent fraction size in real-time. The data fraction size has to be adjusted to the dynamic eluent fraction size to be able to identify peaks correlated to fractions. In this example the number of eluent fractions is doubled for valleys between peaks to increase the resolution and accuracy when calculating preparative peak integration and thereby increase the possibility to collect a more pure sample of the target molecule.

The advantage with using more eluent fractions for each valley is that it is possible to maximize the amount of each target molecule for each identified peak without risk of contamination from other molecules in adjacent peaks. Trig start positions are determined which in this example coincide with the "start of new peak" and trig stop positions are determined which in this example coincide with "end of peak" as illustrated in table 3 below.

TABLE 3

| Data fraction | Derivative signature | trigger | state |
|---|---|---|---|
| 1 | 0− | end of peak | peak A |
| 2 | −0 | | valley |
| 3 | 0+ | | valley |
| 4 | ++ | start of peak | peak B |
| 5 | ++ | | peak B |
| 6 | ++ | | peak B |
| 7 | +− | | peak B |
| 8 | −− | end of peak | peak B |
| 9 | −+ | | valley |
| 10 | ++ | start of peak | peak C |
| 11 | ++ | | peak C |
| 12 | +− | | peak C |
| 13 | −− | | peak C |
| 14 | −− | | peak C |
| 15 | −− | | peak C |
| 16 | −0 | end of peak | peak C |

In this example, each data fractions "2"-"5" and "8"-11" with half the size as the rest of the data fractions are indicated by grey in the table above.

Figure 10:
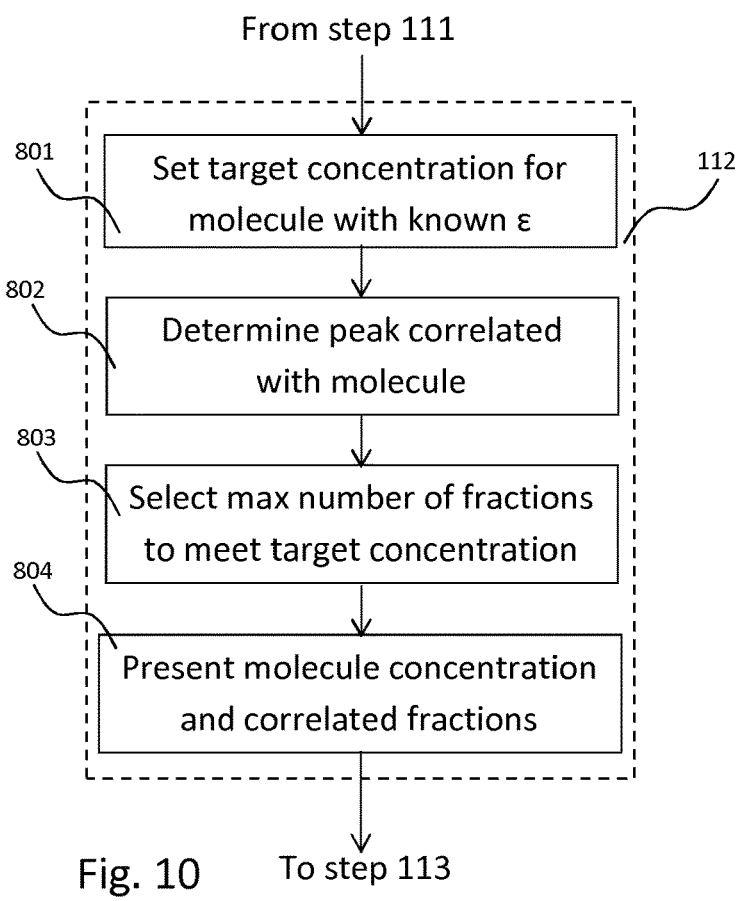
FIG. 10 shows a flow chart of a process to select eluent fractions to achieve a target concentration of a known target molecule.

FIG. 10 shows a flow chart of a process to select eluent fractions to achieve a target concentration of a known target molecule. The process is an alternative embodiment with the specific purpose of increasing the target concentration compared to the presented numbers in 112 (as described in connection with FIG. 3). All eluent fractions contain a known amount of fluid, but the amount of target molecule varies between eluent fractions.

Under specific conditions, it is possible to achieve a target concentration of a molecule, for instance when purifying known molecules with known extinction coefficients. If a target concentration is provided for a molecule, it is possible to automatically adjust the peaks to include only those eluent fractions that make it possible to reach the target concentration. For instance, how many of the eluent fractions identified as being a part of a peak is it possible to include and still reach the target concentration.

As an example, it might be desirable to exclude eluent fractions 14-15 in FIG. 8 from peak C to reach a certain concentration level.

The process assumes the setting of an extinction coefficient for each identified peak 111. This can be performed manually or automatically from a database. Thereafter, a target concentration for a molecule with known extinction coefficient 801 is set, and a peak correlated with molecule 802 is determined. Data fractions within peak is selected 803 to meet target concentration, and the molecule concentration and correlated data fractions is presented 804.

In a first embodiment of the process of selecting data fraction(s) within a peak to meet target concentration, data fractions with average output parameter level being less than a predetermined percentage of the maximum average output parameter level of the peak is excluded.

As an example, the predetermined percentage may be selected to be in the range 1-5% of the maximum average output parameter level of the peak.

In a second embodiment of the process of selecting data fraction(s) within a peak to meet target concentration, data fraction(s) within a peak with the highest average output parameter level is/are selected first, and data fraction having the lowest average output parameter level or being furthest away from the maximum average output parameter level is selected last to meet the target concentration.

Figure 11:
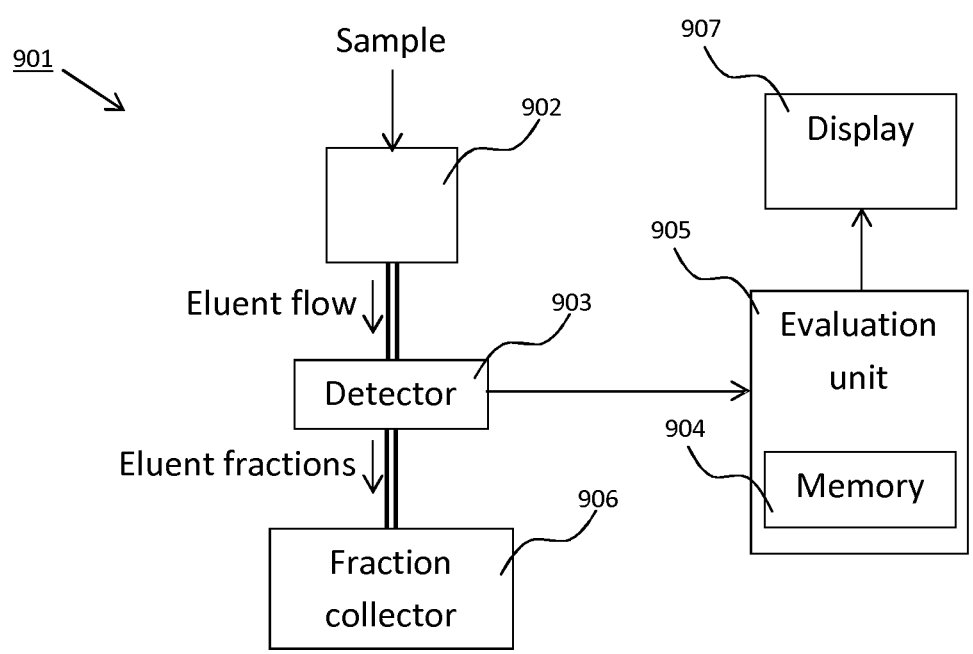
FIG. 11 shows a system for performing liquid chromatography purification adapted to implement the inventive method.

FIG. 11 shows a system 901 for performing liquid chromatography purification of one or more target molecules adapted to use the inventive method as defined in connection with FIGS. 3-10. The system comprises:

a unit 902 adapted to perform chromatography purifications of the sample providing an eluent flow comprising the one or more target molecules. The eluent flow is divided into consecutive eluent fractions and stored in a fraction collector 906, a detector 903 adapted to measure an output parameter indicative of the content of the one or more target molecules in the eluent flow, and a memory 904 for storing output parameter data into data fractions corresponding to said eluent fractions, an evaluation unit 905 adapted to:

each data fraction, obtain a value indicative of characteristic behavior of the measured output parameter, identify trends in the measured output parameter based upon the obtained value in consecutive data fractions, and identify peak(s) in the measured output parameter correlated to eluent fractions based upon the identified trends a display 907 where information of identified peak(s) and correlated eluent fraction(s) can be presented, and purified sample(s) from the eluent may be collected from the fraction collector 906.

The invention claimed is:

1. A method for performing liquid chromatography purification of one or more target molecules from a sample comprising the steps:
    a) performing chromatography purification of the sample providing an eluent flow comprising the one or more target molecules,
    b) measuring an output parameter indicative of the content of the one or more target molecules in the eluent flow, storing output parameter data, and
    c) dividing the eluent flow into consecutive eluent fractions, and dividing the output parameter data into corresponding data fractions,
    wherein said method further comprises the steps:
    d) in each data fraction, obtaining a value indicative of characteristic behavior of the measured output parameter in step b),
    e) identifying trends in the measured output parameter based upon the obtained value in consecutive data fractions,
    f) identifying peak(s) in the measured output parameter correlated to eluent fraction(s) based upon the identified trends,
    g) setting an extinction coefficient for each identified peak,
    h) setting a target concentration for a molecule with known extinction coefficient,
    i) determining peak correlated with the molecule and selecting data fractions within peak to meet the target concentration,
    j) presenting molecule concentration and correlated data fractions, and
    k) switching between a preparative run and an analytic run in response to the molecule concentration and correlated data fractions.

2. The method according to claim 1, wherein said value indicative of characteristic behavior is obtained by calculating average output parameter level in each data fraction based on the measured output parameter in step b).

3. The method according to claim 2, wherein step c) further comprises defining the fraction size of each consecutive eluent fraction.

4. The method according to claim 3, wherein the eluent fraction size is selected to be predetermined.

5. The method according to claim 3, wherein eluent fraction size is selected to be dynamic and the method further comprises the steps:
- determining trig start position(s) and trig stop position(s) based upon the measured output parameter in step b),
- changing the eluent fraction size at each trig start position and restoring the fraction size at each trig stop position, whereby the amount of each target molecule in each identified peak may be increased.

6. The method according to claim 5, wherein the eluent fraction size is reduced at each trig start position.

7. The method according to claim 1, wherein valley(s) are used to identify trends in the measured output parameter, and step e) further comprises determining data fractions being end of peak and determining data fractions being start of new peak to identify each valley.

8. The method according to claim 7, wherein step b) further comprises determining an integration window, and step e) further comprises the steps:
- e1) ensuring that the number of data fractions within the integration window is more than three,
- e2) finding derivative signature for each data fraction by comparing an average output parameter level of the data fraction with average output parameter levels of adjacent data fractions, and
- e3) using the derivative signature to determine end of peak and start of new peak to identify (trends) each valley.

9. The method according to claim 8, wherein step e3) further comprises the steps:
- identifying end of peak being the preceding data fraction when the average output parameter level of the present data fraction is lower in relation to the average output parameter level of the preceding data fraction and when the average output parameter level of the present data fraction is lower or equal in relation to the average output parameter level of the following data fraction, and
- identifying start of new peak being the following data fraction, unless the present data fraction is within a peak, when the average output parameter level of the present data fraction is lower or equal in relation to the average output parameter level of the preceding data fraction and when the average output parameter level of the present data fraction is lower in relation to the following data fraction.

10. The method according to claim 8, wherein the derivative signature comprises two derivative signs, each derivative sign indicating the relationship between average output parameter level of adjacent data fractions, and step e2) further comprises the steps:
- calculating a threshold value for determining a difference in average output parameter level between adjacent data fractions, and
- when the difference in average output parameter level is lower than said threshold value, the average output parameter level of two adjacent data fractions is zero, and
- when the difference in average output parameter level is higher than said threshold value, the derivative sign is positive if the average output parameter level is higher in following data fraction or the derivative sign is negative if the average output parameter level is lower in following data fraction.

11. The method according to claim 10, wherein said threshold value is selected to be less than 5% of the difference between the highest and the lowest calculated average output parameter level for the data fractions within said integration window.

12. The method of claim 8, wherein step f) further comprises the step:
- identifying said peak(s) correlated to consecutive data fractions positioned between said start of peak and said end of peak within said integration window.

13. The method of claim 8, wherein the integration window in step b) is determined by the steps:
- b1) setting the integration window to be a default integration window including the output parameter data in step b), and
- b2) examining the number of output parameter data points within the integration window.

14. The method according to claim 13, further comprising
- b3) adjusting start of the integration window to coincide with a first event if found, said first event being defined as first injection of the eluent, and
- b4) adjusting end of the integration window to include a last event if found, said last event being defined as last consecutive eluent fraction, or if not found last output parameter data.

15. The method according to claim 14, further comprising examining the number of output parameter data points within the integration window, and if less than minimum number of data points the integration window is determined to be the default integration window.

16. The method according to claim 1, wherein data fraction(s) within a peak with an average output parameter level being less than a predetermined percentage of a maximum average output parameter level of the peak is/are excluded when selecting data fractions to meet target concentration.

17. The method according to claim 16, wherein the predetermined percentage is selected to be in the range 1-5% of the maximum average output parameter level of the peak.

18. The method of claim 1, wherein data fraction(s) within a peak with the highest average output parameter level is/are selected first, and data fraction having the lowest average output parameter level or being furthest away from the maximum average output parameter level is selected last to meet the target concentration.

19. The method of claim 18, further comprising the following step:
- g1) presenting peak(s) and correlated eluent fractions of the one or more target molecules, or
- g2) presenting content of molecules in peaks based upon the measured output parameter data.

20. The method of claim 1, wherein the output parameter is selected from the group of: UV absorbance at one or more wavelengths, conductivity, light scattering detection, fluorescence emission, mass-spectroscopy.

21. A system for performing liquid chromatography purification of one or more target molecules, said system comprising:
- a unit adapted to perform chromatography purifications of the sample providing an eluent flow comprising the one or more target molecules, said eluent flow is divided into consecutive eluent fractions,
- a detector adapted to measure an output parameter indicative of the content of the one or more target molecules in the eluent flow, and
- a memory for storing output parameter data into data fractions corresponding to said eluent fractions, wherein said system further comprises an evaluation unit adapted to perform the method of claim 1.

* * * * *